United States Patent
Sakazawa et al.

(10) Patent No.: US 7,437,285 B2
(45) Date of Patent: Oct. 14, 2008

(54) ADAPTIVE MEDIA ENCODING AND DECODING EQUIPMENT

(75) Inventors: Shigeyuki Sakazawa, Saitama (JP); Yasutoshi Watanabe, Saitama (JP); Yasuhiro Takishima, Saitama (JP); Masahiro Wada, Saitama (JP)

(73) Assignee: KDDI Corporation, Tokyo (JP)

( * ) Notice: Subject to any disclaimer, the term of this patent is extended or adjusted under 35 U.S.C. 154(b) by 639 days.

(21) Appl. No.: 10/135,370

(22) Filed: May 1, 2002

(65) Prior Publication Data

US 2002/0173954 A1  Nov. 21, 2002

(30) Foreign Application Priority Data

May 15, 2001  (JP)  ............... 2001-145619

(51) Int. Cl.
G10L 19/00 (2006.01)
G10L 19/14 (2006.01)
G06K 9/36 (2006.01)

(52) U.S. Cl. ............... 704/229; 704/201; 704/E19.044; 370/231

(58) Field of Classification Search ........ 704/229, 704/500, 501, 502, 503, 504, 217, 203, 205, 704/206, 207, 219, 220, 230, 201; 370/231–232
See application file for complete search history.

(56) References Cited

U.S. PATENT DOCUMENTS

| | | | | |
|---|---|---|---|---|
| 5,107,494 A | * | 4/1992 | Johnson et al. | 370/315 |
| 5,115,429 A | * | 5/1992 | Hluchyj et al. | 370/231 |
| 5,148,429 A | * | 9/1992 | Kudo et al. | 370/473 |
| 5,412,642 A | * | 5/1995 | Nunokawa | 370/253 |
| 5,414,796 A | * | 5/1995 | Jacobs et al. | 704/221 |
| 5,506,844 A | * | 4/1996 | Rao | 370/468 |
| 5,675,379 A | * | 10/1997 | Kato et al. | 348/97 |
| 5,774,455 A | * | 6/1998 | Kawase et al. | 370/232 |
| 5,949,956 A | * | 9/1999 | Fukuda | 386/112 |
| 5,956,674 A | * | 9/1999 | Smyth et al. | 704/200.1 |
| 6,047,007 A | * | 4/2000 | Munday et al. | 370/545 |
| 6,327,562 B1 | * | 12/2001 | Proust | 704/219 |
| 6,496,794 B1 | * | 12/2002 | Kleider et al. | 704/201 |
| 6,868,156 B1 | * | 3/2005 | Narayan et al. | 379/386 |
| 7,080,009 B2 | * | 7/2006 | Proctor et al. | 704/221 |

* cited by examiner

*Primary Examiner*—James S Wozniak
(74) *Attorney, Agent, or Firm*—Westerman, Hattori, Daniels & Adrian, LLP.

(57) ABSTRACT

An encoding unit encodes data at a first rate during an initial predetermined section of uncompressed data (a), and encodes data at a second rate after the initial predetermined section (where the first rate<the second rate), and encoded data are stored in a storage. The storage is read out the stored data to a network at a transmission rate equal to the transmission rate of the network. A decoding unit decodes received data at the first rate during an initial predetermined section, and decodes received data at a second rate after the initial predetermined section. For finite contents, receiving completion and decoding completion of the received data are simultaneous. In accordance with the present invention, while tolerance with respect to data incoming fluctuations is ensured, playback of dynamic images and music and the like can be immediately started after receiving. Further, by carrying out control suitable for data (finite contents) in which a duration time of the contents is relatively short, even higher quality data can be transmitted.

6 Claims, 5 Drawing Sheets

ADAPTIVE MEDIA ENCODING AND DECODING EQUIPMENT

BACKGROUND OF THE INVENTION

1. Field of the Invention

The present invention relates to an adaptive media encoding and decoding equipment, for dynamic image data or voice data or the like, which is suitable for use with Internet or the like.

2. Description of the Related Art

Conventionally, a dynamic image (or a media) transmitting system having a control which suppresses network convergence in a Cable Internet has been developed. Further, in the dynamic image transmitting system, a system, using a transport protocol with an incoming confirmation and resending function such as TCP or the like, has been proposed.

When packet telecommunication is carried out regardless of whether communication is by cable or radio, data incoming fluctuations arise in the data reaching the receiving equipment due to retransmission by a packet loss or the like. In order to absorb the data incoming fluctuations, a receiving buffer is provided in the receiving equipment. Tolerance of the receiving buffer with respect to data incoming fluctuations becomes stronger, the more the data are stored initially.

Further, when the packet loss is extremely large or the like, the throughput of the receivable data is low, and there is a fear that incoming of the data will not be in time for the decoding at the receiving side. At this time, usually, in order to suppress network convergence, control to reduce the bit rate of the video is carried out. Further, at this time, control is carried out such that stable operation is carried out when the duration time of the contents is very long.

The tolerance of this receiving buffer with respect to data incoming fluctuations becomes stronger, the more the data are accumulated initially. However, on the other hand, there are problems in that it takes much time from the start of receiving until much data is accumulated, and it takes much time until the start of playback of a dynamic image or music.

As described above, in order to smoothly carry out decoding at the receiving side, the system is controlled so as to operate stably when the duration time of the contents is very long. However, for example, considering services directed to cellular phones or the like, the duration time of the contents is relatively short. Therefore, there is a problem that a case in which the duration time of the contents is relatively short is not given any consideration in the conventional system.

SUMMARY OF THE INVENTION

An object of the invention is to provide an equipment in which, while tolerance with respect to data incoming fluctuations is ensured, playback of dynamic images and music and the like can be immediately started after receiving. Further, another object is to provide an equipment in which, by carrying out control suitable for data (finite contents) in which a duration time of the contents is relatively short, even higher quality data can be transmitted.

In order to achieve the object, the invention is firstly characterized in that an adaptive media encoding equipment encoding uncompressed data comprises an encoding unit for encoding the uncompressed data at a first rate during an initial predetermined section and encoding at a second rate after the initial predetermined section (where the first rate<the second rate), and a storage for storing the data encoded in the encoding unit. The invention is secondly characterized in that an adaptive media decoding equipment comprises a receiving buffer for receiving the data transmitted via the network from the adaptive media encoding equipment of claim 1, and a decoding unit for decoding the received data at the first rate during an initial predetermined section, and decoding at a second rate after the initial predetermined section.

According to the first and second characteristics, an adaptive media encoding and decoding equipment is provided, in which while tolerance with respect to data incoming fluctuations is ensured, playback of dynamic images and music and the like can be immediately started after receiving.

The invention is thirdly characterized in that an adaptive media decoding equipment comprises a receiving buffer for receiving encoded data having finite length contents of a relatively short length, and a decoding unit for decoding data accumulated in the receiving buffer, wherein completion of receiving at the receiving buffer and completion of decoding at the decoding unit are simultaneous. According to the third characteristics, an adaptive media encoding and decoding equipment is provided, in which by carrying out control suitable for data (finite contents) in which a duration time of the contents is relatively short, even higher quality data can be transmitted.

DETAILED DESCRIPTION OF THE PREFERRED EMBODIMENT

Figure 1:
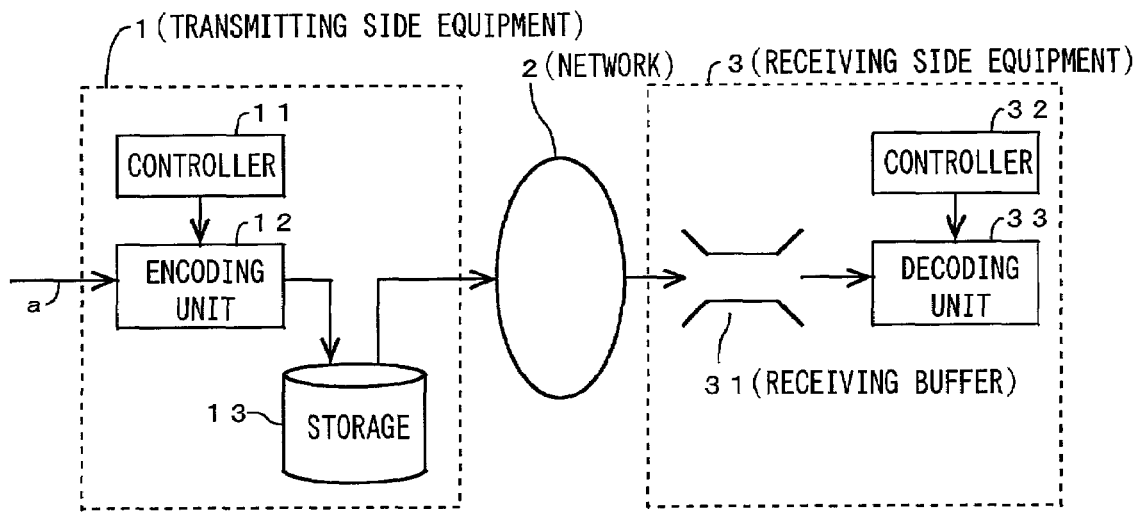
FIG. 1 is a block diagram showing a schematic structure of a first embodiment of the present invention.

FIG. 1 is a block diagram showing a system structure of one embodiment of the present invention.

In the figure, a transmitting side equipment 1 includes a controller 11, an encoding unit 12, and a storage 13 storing encoded data. Further, a receiving side equipment 3 contains a receiving buffer 31, a controller 32, and a decoding unit 33. The aforementioned transmitting side equipment 1 and the receiving side equipment 3 are connected by a network 2.

Figure 2:
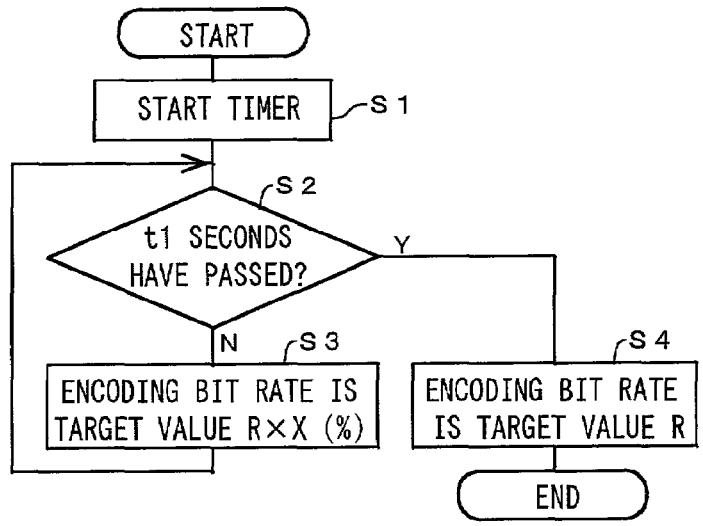
FIG. 2 is a flowchart showing operation of a controller at a transmitting side of FIG. 1.

Next, operations of the present embodiment will be described. The controller 11 controls encoding bit rate of the encoding unit 12. The operation of the controller 11 will be described with reference to FIG. 2. When encoding is started, an unillustrated timer starts in step S1. In step S2, it is determined whether t1 seconds have passed or not. When this determination is negative, the routine proceeds to step S3, and the encoding bit rate is set to x % of a target value R (0<x<100). On the other hand, when this determination is affirmative, the routine proceeds to step S4, and the encoding bit rate is set to the target value R.

Figure 3:
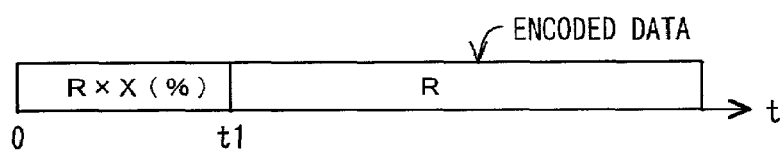
FIG. 3 is a schematic diagram of data encoded in an encoding equipment of FIG. 1.

The encoding unit 12 encodes uncompressed dynamic images (or video data) or voice data (a) which is media data at the encoding bit rate instructed by the controller. The encoded data are stored, with file names added thereto, in the storage 13. The encoded data stored in the storage 13 become, as shown in FIG. 3, data encoded by the encoding bit rate R×x (%) during time 0 through t1, and data encoded by the encoding bit rate R after time t1.

Next, when transmission of data from the receiving side equipment 3 to the transmitting side equipment 1 is requested, the storage 13 reads out and transmits the encoded data at the transmission bit rate of the network 2 from the start. Here, the transmission bit rate of the network 2=the target encoding bit rate R of the encoding unit.

Figure 4:
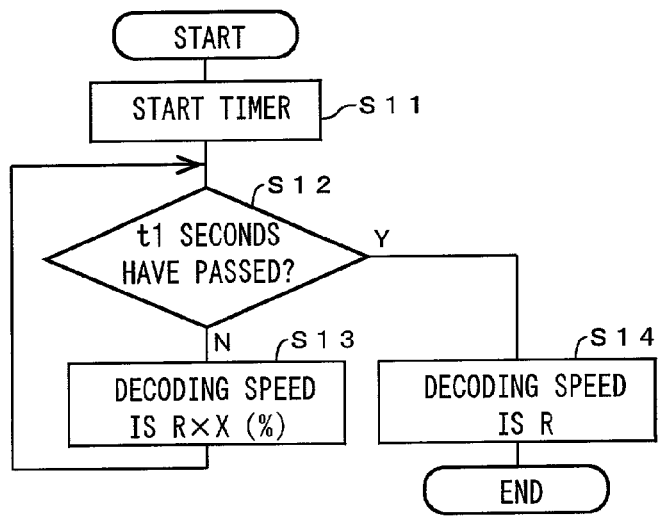
FIG. 4 is a flowchart showing operation of a controller at a receiving side of FIG. 1.

In the receiving side equipment 3, it is already known that the data stored in the storage 13 of the transmitting side equipment 1 is encoded at an encoding bit rate R×X(%) until the time t1 and is encoded at an encoding bit rate R after the time t1. Thus, the controller 32 carries out decoding control as shown in FIG. 4. Namely, in step S11, a timer is started, and in step S12, whether t1 seconds has passed or not is determined. When this determination is negative, the routine proceeds to step S13 where the decoding speed is made to be R×x(%). On the other hand, when the determination is affirmative, the routine proceeds to step S14 where the decoding speed is made to be R.

Figure 5:
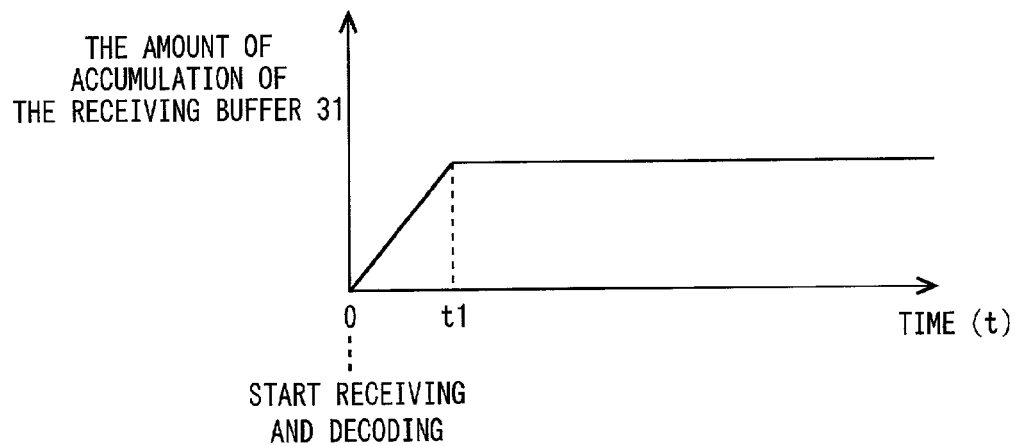
FIG. 5 is a graph showing the amount of accumulation of a receiving buffer.

Because the transmitting side equipment 1 and the receiving side equipment 3 carry out the above-described operations, even if the receiving side equipment 3 starts decoding at the same time of receiving data, tolerance with respect to data incoming fluctuations is ensured. Namely, because the receiving buffer 31 receives data at a transmitting speed R from the network 2 during the time 0 through t1 and the data is decoded at the decoding speed R×x(%), the amount of accumulation of the receiving buffer 31 increases during 0 through t1 as shown in FIG. 5. Further, after t1, because the amount of data received from the network 2 and the amount of data transmitted to the decoding unit 33 are equal, the amount of accumulation of the receiving buffer 31 is constant.

Note that, given that the amount of accumulation of the receiving buffer 31 necessary for absorbing data incoming fluctuations is K bits, the aforementioned time t1 is suitably t1=K/R(1−x/100).

As described above, in accordance with the present embodiment, since data of Kbits are stored in the receiving buffer 31 after t1 seconds from starting to receive, the receiving side equipment can start decoding at the same time of receiving data, while ensuring tolerance with respect to data incoming fluctuations.

Next, a second embodiment of the present invention will be described with reference to FIG. 6. In this embodiment, the transmitting equipment includes the encoding unit 12, a controller 14, a stream conversion unit 15, and the storage 13. The stream conversion unit 15 has a function of reducing the bit rate of the transmitted data, and one concrete example thereof is shown in FIG. 7.

Figure 7:
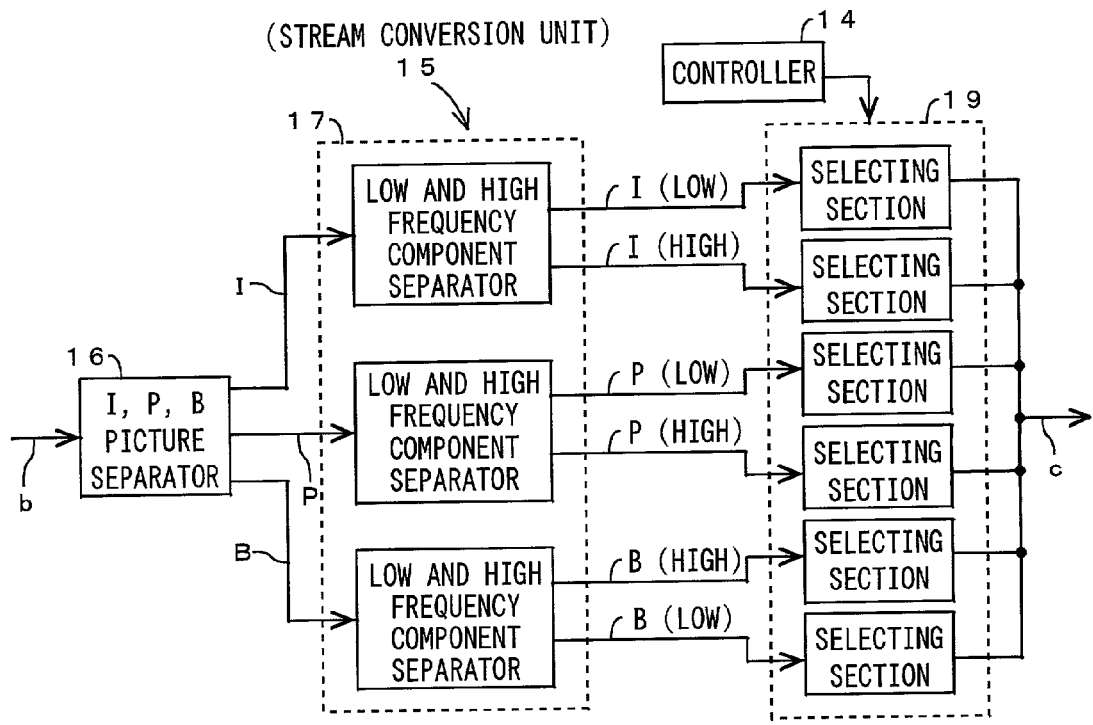
FIG. 7 is a block diagram showing one concrete example of a stream conversion equipment of FIG. 6.

As shown in FIG. 7, the stream conversion unit 15 comprises on I, P, B picture separator 16, a low and high frequency component separator 17 and a selecting section 19. When the data inputted to the encoding unit 12 is a dynamic image, the stream conversion unit 15 separates encoded data or re-encoding compressed data (b) by the encoding unit 12 into I, P, and B pictures, and next, separates each of the I, P, and B pictures into a low frequency component and high frequency component. The separated low and high frequency components are respectively transmitted to selecting sections 19, and are selected or deleted by control from the controller 14. As a result, data (c) in which the bit rate is reduced is output from the stream conversion unit 15.

Figure 8:
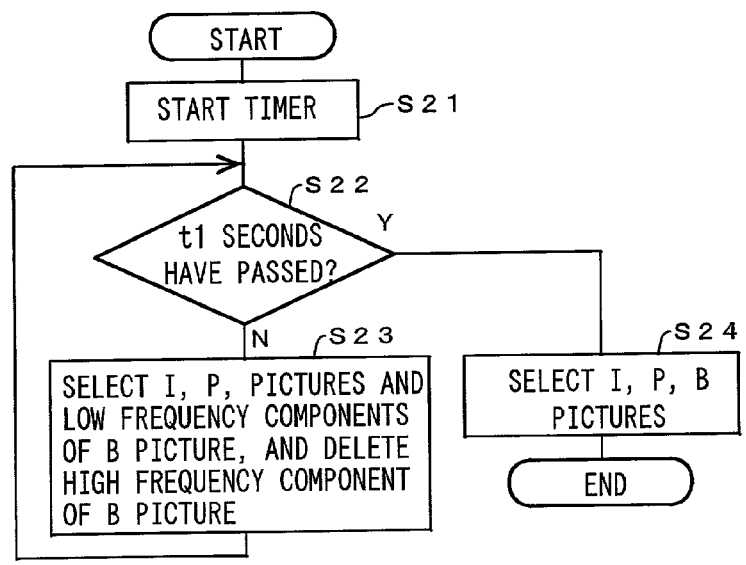
FIG. 8 is a flowchart showing operation of a controller at a transmitting side of FIG. 6.

An operation example of the controller 14 is shown in FIG. 8. In step S21, an unillustrated timer is started, and in step S22, whether t1 seconds have passed or not is determined. In step S23, the I, P pictures and the low frequency components of the B picture are selected by the selecting sections 19, and the high frequency component of the B picture is deleted. When the aforementioned determination is affirmative, the routine proceeds to step S24 where the I, P, and B pictures are selected and output. Accordingly, in the storage 13, data having a low bit rate are stored till t1 seconds, and after t1 seconds have passed, data having a high bit rate are stored.

Figure 6:
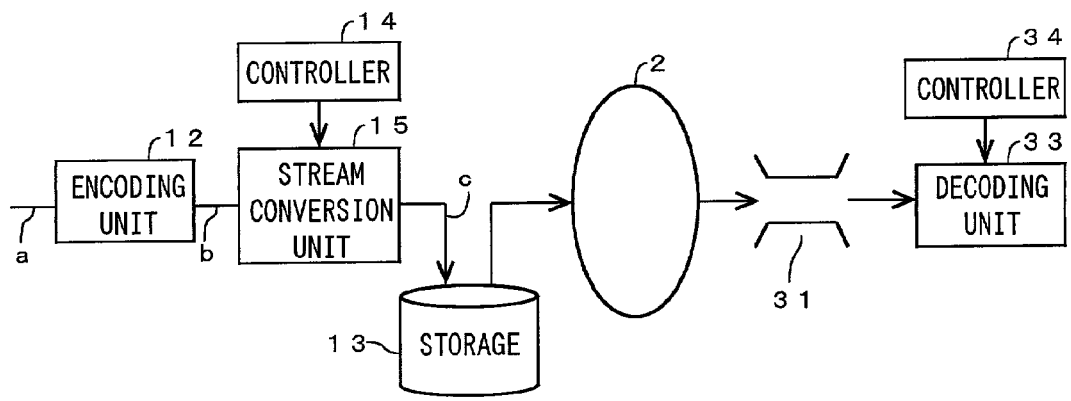
FIG. 6 is a block diagram showing a schematic structure of a second embodiment of the present invention.
Figure 9:
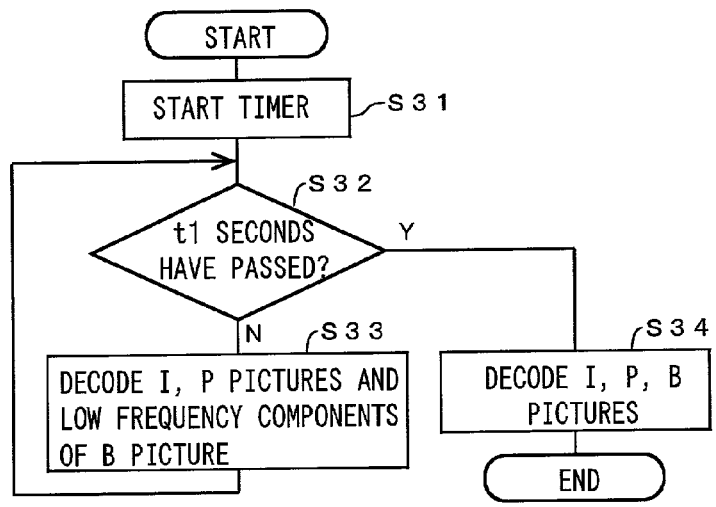
FIG. 9 is a flowchart showing operation of a controller at a receiving side of FIG. 6.

The receiving side equipment includes the receiving buffer 31, the decoding unit 33, and the controller 34 as shown in FIG. 6. As shown in FIG. 9, when the determination in step S32 is negative, the controller 34 instructs the decoding unit 33 to decode the I, P pictures and the low frequency components of the B picture. On the other hand, when the determination is affirmative, the routine proceeds to step S34 where the I, P, and B pictures are decoded.

When a request for data transmission is received from the receiving side equipment, in the same way as in the first embodiment, data is read, from the storage 13 of the transmitting side equipment, at a transmitting speed equal to the transmitting speed of the network 2, and is transmitted to the receiving buffer 31. Thus, it is clear that effects similar to those of the first embodiment can be obtained.

Figure 10:
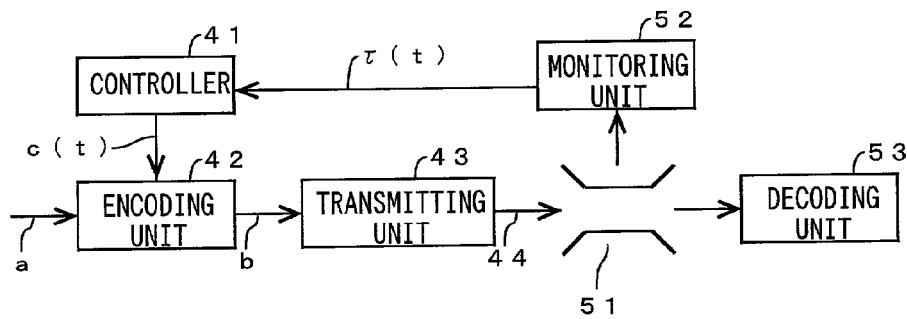
FIG. 10 is a block diagram showing a schematic structure of a third embodiment of the present invention.

Next, a third embodiment of the present invention will be described with reference to FIG. 10. In the figure, a controller 41 determines an encoding bit rate c(t) as will be described later, and outputs it. An encoding unit 42 encodes uncompressed dynamic image or voice data (a) having a relatively short finite length (hereinafter called finite contents (a)) at an encoding bit rate instructed from the controller 41. The encoded data (b) is transmitted to a network 44 by a transmitting unit 43.

On the other hand, the receiving side equipment is formed from a receiving buffer 51, a monitoring unit 52 monitoring the amount of data accumulation thereof, a decoding unit 53, and the like. The monitoring unit 52 notifies the amount of data accumulation τ(t) of the receiving buffer 51 to the controller 41.

Here, the controller 41 determines the encoding bit rate c(t) as follows. At a certain time t, given that a remaining time of the finite contents (a) (the amount not transmitted yet) is r(t) seconds, a target value of the amount of accumulation of the receiving buffer 51 is T(t), the amount of data actually accumulated in the receiving buffer 51 is τ(t), and a transmitting bit rate is v(t), the encoding bit rate c(t) of the finite contents (a) can be determined by the following equation (1) or (2).

$$T(t+\Delta t) = \tau(t) - \Delta t + (v(t)/c(t)) \times \Delta t \qquad (1)$$

$$T(t+\Delta t) = \tau(t) + \Delta t - (c(t)/v(t)) \times \Delta t \qquad (2)$$

Here, Δt is the time resolution of control, and for example, when control is carried out at one time per second, Δt=1.

The target value T(t) of the amount of accumulation of the receiving buffer 51 is a parameter relating to the capability for absorbing jitters accompanying the data transmission. As shown by curves p1, p2, . . . of FIG. 11, the period between time t3 and t2 can be an arbitrary curve. Here, t2 shows the playback completing time of the finite contents (a). Note that, conventionally, the controller 41 effects control such that there is stable operation when the duration of the contents is very long. Thus, a straight line q has been adopted. Note that the ordinate of FIG. 11 shows target value T(t) of the amount of accumulation, and the abscissa shows time t.

Figure 12A:
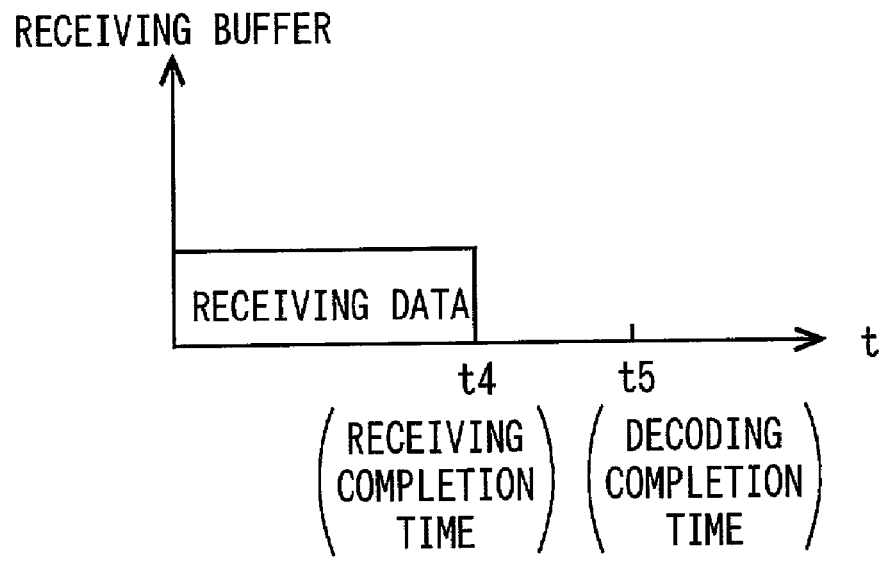
FIGS. 12A and 12B are graphs showing the relationships of a receiving completion time and a decoding completion time.
Figure 12B:
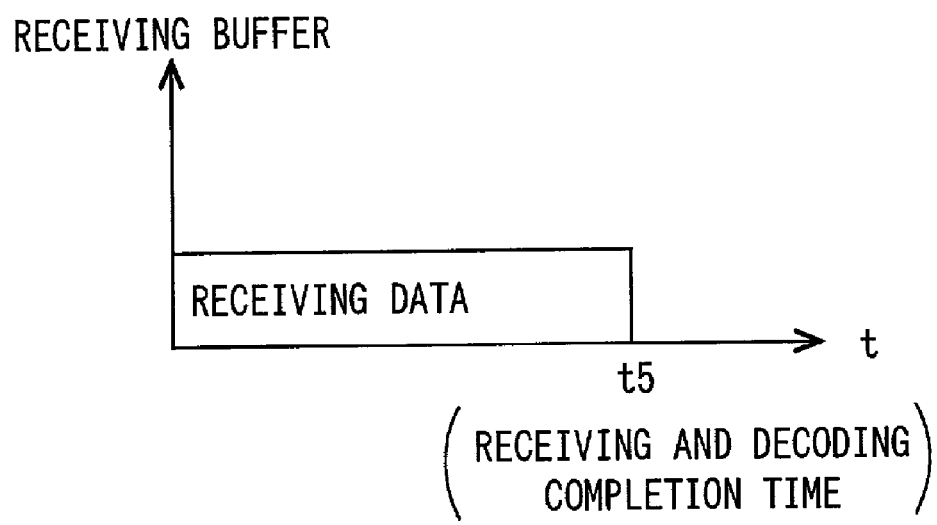

FIGS. 12A, B are graphs showing data receiving completion time t4 and decoding completion time t5 of the receiving buffer 51. FIG. 12A shows the conventional art, and FIG. 12B shows the present embodiment. As is clear from the figures, because control of aforementioned curve q is carried out conventionally, the data receiving completion time t4 and the decoding completion time t5 do not coincide. However, in the present embodiment, because control of the aforementioned curves p1, p2, . . . is carried out, the data receiving completion time t4 and the decoding completion time t5 coincide.

Figure 11:
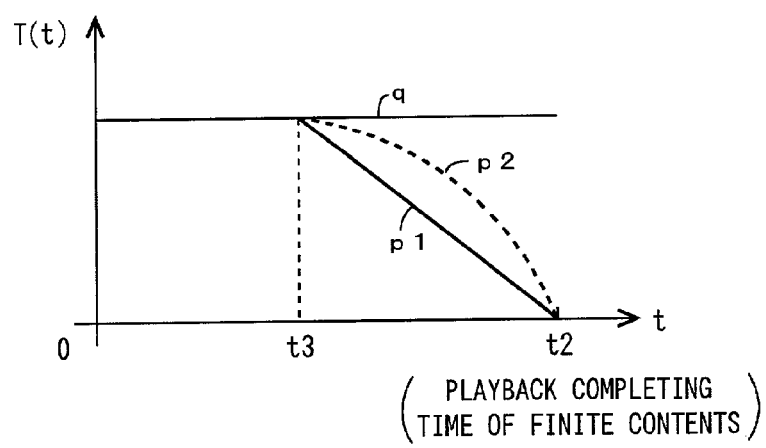
FIG. 11 is a graph showing the amount of accumulation of the receiving buffer.

In the present embodiment, as seen by the curves p1, p2, . . . of FIG. 11, the reduction of T(t) is started from time t3, and T(t)=0 at time t2. Thus, during the period from t3 to t2, as is clear from the aforementioned equation (1), the encoding bit rate c(t) of the contents (a) can be large. In other words, because it is fine even if the receiving buffer is finally empty, the encoding bit rate c(t) can be made higher, and image quality can be improved. Further, in the present embodiment, because control, which is suitable for data in which the duration time of the contents is relatively short (finite contents), is carried out, higher quality data than in the conventional art can be transmitted.

As described above, in accordance with the above-described first and second embodiments, when a transmission request of dynamic images or voice data is carried out from the receiving side to the transmitting side, the receiving side can decode at the same time of receiving data, and dynamic images or music can be presented to a receiver in a short waiting time. Further, in accordance with the above-described third embodiment, high quality dynamic images and music can be presented to a user of a mobile machine, such as a cellular phone or the like, using data in which the duration time of the contents is relatively short.

As is clear from the above description, in accordance with the present invention, the receiving equipment can decode received data at the same time as receiving it, while ensuring tolerance with respect to data incoming fluctuations. Therefore, reliability of the operation is ensured, and dynamic images and music can be presented to a receiver such as a mobile machine or the like with hardly any waiting time.

Further, in accordance with the present invention, control which is suitable for data (finite contents) in which the duration time of the contents is relatively short can be carried out, and high quality data can be transmitted.

What is claimed is:

1. An adaptive media encoding equipment encoding uncompressed data comprising:
   an encoding unit for encoding the uncompressed data at a first rate during an initial predetermined time period $$t_1 = \frac{K}{R\left(1 - \frac{x}{100}\right)}$$

(where K is an amount of accumulation necessary for absorbing data incoming fluctuations, R is a target value of an encoding bit rate, and 0<x<100) and encoding at a second rate after the initial predetermined time period (where the first rate<the second rate); and
   a storage for storing the data encoded in the encoding unit,
   wherein after the encoded data was stored in the storage, it is transmitted to a network,
   wherein the second rate is equal to a transmission rate of the network, and the storage is read out the stored data at the transmission rate of the network to transmit it to the network.

2. An adaptive media decoding equipment comprising: a receiving buffer for receiving the data transmitted via the network from the adaptive media encoding equipment of claim 1; and
   a decoding unit for decoding the received data at the first rate during an initial predetermined time period, and decoding at a second rate after the initial predetermined time period.

3. An adaptive media decoding equipment comprising:
   a receiving buffer for receiving the data transmitted via the network from the adaptive media encoding equipment of claim 1; and
   a decoding unit for decoding the received data at the first rate during an initial predetermined time period, and decoding at a second rate after the initial predetermined time period;
   wherein the decoding is started when data at the first rate is received.

4. An adaptive media encoding equipment encoding one of uncompressed data and re-encoding compressed data, comprising:
   an encoding unit for encoding the uncompressed or re-encoding compressed data;
   a stream conversion unit for reducing the data from the data encoded by the encoding unit; and
   a storage for storing data output from the stream conversion unit,
   wherein, at the stream conversion unit, the data is reduced at a first reducing rate during an initial predetermined time period of the encoding data, and is reduced at a second reducing rate including 0 after the initial predetermined time period (where the first reducing rate<the second reducing rate),
   wherein after the encoded data was stored in the storage, it is transmitted to a network,
   wherein the second rate is equal to a transmission rate of the network, and the storage is read out the stored data at the transmission rate of the network to transmit it to the network,
   wherein the initial predetermined time period is $$t_1 = \frac{K}{R\left(1 - \frac{x}{100}\right)}$$

(where K is an amount of accumulation necessary for absorbing data incoming fluctuations, R is a target value of an encoding bit rate, and 0<x<100).

5. An adaptive media decoding equipment comprising:
   a receiving buffer for receiving encoded data having finite length contents of a relatively short length;
   a controller for dynamically controlling an encoding rate of the encoding equipment in accordance with a target value of an amount of accumulation of the receiving buffer;

and a decoding unit for decoding data accumulated in the receiving buffer, wherein the decoding unit decodes the received data at a first rate during an initial predetermined time period and decodes at a second rate after the initial predetermined time period, and wherein completion of receiving at the receiving buffer and completion of decoding at the decoding unit are simultaneous, wherein the initial predetermined time period is $$t_1 = \frac{K}{R\left(1 - \frac{x}{100}\right)}$$

(where K is an amount of accumulation necessary for absorbing data incoming fluctuations, R is a target value of an encoding bit rate, and 0<x<100).

6. An adaptive media encoding equipment according to claim 5, wherein the target value of the amount of accumulation of the receiving buffer starts to be reduced before a decoding completion time of the finite contents, and becomes 0 at the decoding completion time.

* * * * *